United States Patent
Ozaki et al.

(10) Patent No.: US 6,683,174 B1
(45) Date of Patent: Jan. 27, 2004

(54) CELLULOSE TRIACETATES AND METHODS FOR PRODUCING THE CELLULOSE TRIACETATES

(75) Inventors: Toru Ozaki, Niigata (JP); Hiroshi Ogawa, Hyogo (JP); Hirofumi Sasai, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/831,454

(22) PCT Filed: Nov. 12, 1999

(86) PCT No.: PCT/JP99/06337

§ 371 (c)(1),
(2), (4) Date: May 8, 2001

(87) PCT Pub. No.: WO00/31143

PCT Pub. Date: Jun. 2, 2000

(51) Int. Cl.[7] .............. C08B 3/06; C08B 3/24
(52) U.S. Cl. ............. 536/69; 536/56; 536/58; 536/70; 536/71; 536/76
(58) Field of Search ................. 536/1–11, 56, 536/58, 69, 71, 70, 124

(56) References Cited

U.S. PATENT DOCUMENTS

| | | |
|---|---|---|
| 3,631,023 A | 12/1971 | Horne et al. |
| 4,385,172 A | 5/1983 | Yasnovsky et al. |
| 4,439,605 A * | 3/1984 | Uchida et al. |

FOREIGN PATENT DOCUMENTS

| | | |
|---|---|---|
| EP | 0 590 401 A2 | 4/1994 |
| EP | 0 769 500 A1 | 4/1997 |
| JP | 56-14501 | 2/1981 |
| JP | 63-117001 | 5/1988 |
| JP | 9-188701 | 7/1997 |

OTHER PUBLICATIONS

Bulletin of the Institute of Paper Chemistry, Appleton, US, vol. 59, No. 9, 1989.

* cited by examiner

*Primary Examiner*—Samuel Barts
*Assistant Examiner*—Michael C. Henry
(74) *Attorney, Agent, or Firm*—Flynn, Thiel, Boutell & Tanis, P.C.

(57) ABSTRACT

The present invention provides a cellulose triacetate which exhibits a satisfactory filtration performance Thus, the present invention provides a cellulose triacetate whose occlusion constant (K) determined by the following method is 70 or less. Method: the cellulose triacetate is dissolved in a solvent mixture of methylene chloride/methanol (9/1 w/w) to form a 16% by weight (as a solid concentration) solution, which is then filtered under a constant pressure at the filtration pressure of 3 kg/cm$^2$ and the temperature of 25° C. using a muslin filter to determine a filtered volume with the lapse of time, from which the slope of a linear curve represented by t/V–t (wherein t is a filtration time (sec) and V is a filtered volume (ml)) is calculated to obtain an occlusion constant (K) where K=slope×2×10$^4$.

8 Claims, No Drawings

CELLULOSE TRIACETATES AND METHODS FOR PRODUCING THE CELLULOSE TRIACETATES

This the National Phase Application of PCT/JP99/06337, filed Nov. 12, 1999.

TECHNICAL FIELD

The present invention relates to a cellulose triacetate employed preferably as a protective film for a plate of polarization, a color filter, a photosensitive material film or a fibrous material, and to a method for producing the cellulose triacetate.

PRIOR ART

A film obtained from a cellulose triacetate is employed as a support of an optical film such as a photosensitive material film, a protecting film for a plate of polarization in a liquid crystal display and a color filter, since it is tough, has excellent dimensional stability and thermal stability and also exhibits an optically isotropic behavior. In addition, a fiber made from a cellulose triacetate is employed widely as a fiber for various clothing due to its excellent texture and gloss.

Cellulose triacetate is usually produced by various processes such as activation, acetylation and saponification ripening treatments followed by purification and drying treatments. Among these manufacturing processes, a saponification ripening process is performed for reducing the acetylation degree to an intended level, and effected at a temperature of 60 to 70° C. by means of an external heating or an introduction of steam into the reaction system for the purpose of reducing the treatment period.

However, cellulose triacetate produced via the saponification ripening process described above contains fine inclusions which could not be removed by filtration. Accordingly, such fine inclusions, when contained in a large amount, causes plugging of a spinning nozzle in a spinning step, resulting in a reduced productivity.

DISCLOSURE OF THE INVENTION

An objective of the present invention is to provide a cellulose triacetate which is capable of suppressing the formation of fine inclusions which are difficult to filter out and which allows the inclusions to be removed easily by means of a filtration, and a method for producing the cellulose triacetate.

The inventors focused on the causes for the generation of fine inclusions in a saponification ripening process being an unevenly proceeding saponification reaction which leads to an inconsistent acetylation degree of the resultant cellulose triacetate and a large amount of a highly substituted component (completely acetylated glucose unit). Then they discovered that such an uneven reaction is attributable to the uneven temperature in the reaction system, particularly to a partial exposure to a high temperature. Since a reaction system upon completion of an acetylation process is in the state of a highly viscous solution, an external heating mode, even when combined with a stirring means, allows the highly viscous solution in contact with the inner wall of a vessel to be mixed only insufficiently and exposed to the high temperature for a prolonged period, resulting in an increased tendency of the more-deacetylated component formation On the other hand, an internal heating method using a superheated steam allows a cellulose triacetate in contact with water condensed from the superheated steam to precipitate to form a solid phase, resulting in a retarded saponification and an increased residual level of highly acetylated components. Accordingly, they discovered that a cellulose triacetate containing a smaller amount of fine inclusions and exhibiting a satisfactory filtration performance can be obtained by utilizing reaction heat generated uniformly throughout the entire reaction system to prevent the uneven temperature of the reaction system described above, thereby establishing the present invention.

Thus, the present invention provides a cellulose triacetate having an occlusion constant (K) of 70 or less, determined by the following method: Method:

The cellulose triacetate is dissolved in a solvent mixture of methylene chloride/methanol (=9/1 w/w) to form a 16% by weight (as a solid concentration) solution, which is then filtered under a constant pressure at the filtration pressure of 3 kg/cm$^2$ and the temperature of 25° C. using a muslin filter to determine a filtered volume with the lapse of time, from which the slope of a linear curve represented by t/V–t (wherein t is a filtration time (sec) and V is a filtered volume (ml)) is calculated to obtain an occlusion constant (K) where K=slope×2×10$^4$.

The present invention also provides a method for producing a cellulose triacetate described above comprising an acetylation process and a saponification ripening process, wherein a saponification ripening treatment is performed only by means of the elevation of the temperature due to the reaction heat between the water added for quenching the acetylating reaction and remaining unreacted acetic anhydride without any external heating. In other words, the method provided is a method for producing a cellulose triacetate comprising acetylating cellulose followed by a saponification ripening treatment only by means of the elevation of the temperature due to the reaction heat between the water added for quenching the acetylating reaction and remaining unreacted acetic anhydride without any external heating Preferably, cellulose is subjected to a pretreatment activation, an acetylation and then a saponification ripening treatment at a temperature of 40° C. or higher but below 60° C. only by means of the elevation of the temperature due to the reaction heat between the water added for quenching the acetylating reaction and remaining unreacted acetic anhydride without any external heating.

Since cellulose triacetate of the present invention contains an extremely small amount of fine inclusions which are difficult to filter out, it does not plug a filter, even when the pore size is small, and allows any inclusions to be filtered out easily. As a result, it prevents the occlusion of a spinning nozzle and allows a fiber having a stable cross-sectional configuration to be produced, even when the spinning is continued for a prolonged period with the cellulose triacetate of the present invention.

DETAILED DESCRIPTION OF THE INVENTION

The cellulose triacetate of the present invention is one whose occlusion constant (K) determined by the following method is 70 or less, preferably 60 or less. An occlusion constant not higher than 70 serves to improve the filtration performance and allows any inclusions, which are undesirable in a spinning process, to be filtered out easily.
Method:

The cellulose triacetate is dissolved in a solvent mixture of methylene chloride/methanol (=9/1 w/w) to form a 16% by weight (as a solid concentration) solution, which is then filtered under a constant pressure at the filtration pressure of 3 kg/cm$^2$ and the temperature of 25° C. using a muslin filter to determine a filtered volume with the lapse of time, from which the slope of a linear curve represented by t/V–t (wherein t is a filtration time (sec) and V is a filtered volume (ml)) is calculated to obtain an occlusion constant (K) where K=slope×2×10$^4$. The curve of t/V–t is discussed for example in "*POLYMER ENGINEERING (KOBUNSHIKOGAKUKOZA)* 4, Chemical fiber spinning and film formation (11)", Ed. by *The society of Polymer Science, Japan, page 116 to 125, 1965.

The cellulose triacetate of the present invention has an average acetylation degree preferably of 59 to 62.5%, more preferably 59.5 to 62.0%, and most preferably 60 to 61.5%. An average acetylation degree of 59% or higher allows the cellulose acetate to have a low moisture absorption, which leads to an improvement in the mechanical strength of a molded article such as the modulus of the elasticity and the tensile strength. An average acetylation degree of 62.5% or less enables the production by a reaction of acetic anhydride employing a sulfuric acid catalyst.

An acetylation degree can be determined in accordance with ASTM D-817-91 (testing method for cellulose acetates and the like) for determining an acetylation degree. First, 1.9 g of a dried cellulose triacetate is weighed accurately, dissolved in 150 ml of a mixture (4:1 volume ratio) of acetone and dimethyl sulfoxide, followed by the addition of 30 ml of a 1N aqueous solution of sodium hydroxide to saponify at 25° C. for 2 hours. Subsequently, phenolphthalein solution is added as an indicator to titrate excessive sodium hydroxide with 1N sulfuric acid and then the acetylation degree is calculated according to the following equation. A blank is tested in a similar manner.

Acetylation degree(%)=[6.005×(B−A)×F]/W wherein A is the volume in ml of 1N sulfuric acid required for titrating a sample, B is the volume in ml of 1N sulfuric acid required for titrating the blank, F is the concentration factor of 1N sulfuric acid and W is the sample weight.

The cellulose triacetate of the present invention has a viscosity average degree of polymerization preferably of 200 to 400, more preferably 250 to 400, most preferably 270 to 400, particularly 270 to 350. An average degree of polymerization of 200 or higher serves to increase the strength of a molded article such as a film or a fiber, while one not higher than 400 serves to keep the viscosity upon preparation of a solution at a suitable level thus enabling an easy handling.

A viscosity average degree of polymerization described above can be determined by an intrinsic viscosity method by Oda et al (K.Uda et al., *JOURNAL OF FIVER SOCIETY (SENIGAKKAISHI)*, Vol.18, No.1, page 105 to 120, 1962). First, cellulose triacetate is dissolved in a solvent mixture of methylene chloride/methanol (9/1, w/w) to prepare a solution of a certain concentration c (2.00 g/L). This solution is then introduced into an Ostwald viscometer to determine the time period t (sec) during which the solution passes through the distance between the marks on the viscometer. On the other hand, the filtration time to (sec) of the solvent mixture alone is also determined, and the viscosity average degree of polymerization (DP) is determined according to the following equation:

$\eta_{rel} = t/t_0$ $[\eta] = (\ln \eta_{rel})/c$ $DP = [\eta]/(6 \times 10^{-4})$ wherein t is a time period in seconds during which a sample solution falls down; $t_0$ is a time period in seconds during which the solvent mixture falls down; c is the concentration (g/L) of the cellulose triacetate in the sample; and $\eta_{rel}$ is a relative viscosity and [7] is an intrinsic viscosity.

The cellulose triacetate of the present invention, when prepared as a 6% by weight solution in a solvent mixture of methylene chloride/methanol (9/1, w/w), has a viscosity preferably of 200 to 700 mPa.s, more preferably 250 to 600 mPa.s, most preferably 250 to 500 mPa.s.

A method for producing cellulose triacetate of the present invention is described below.

First, cellulose is combined with acetic acid to effect a pretreatment activation. The amount of acetic acid employed in this pretreatment activation is preferably 10 to 500 parts by weight to 100 parts by weight of the cellulose. The pretreatment activation is performed preferably under a closed and stirred condition, preferably at 20 to 50° C. for 0.5 to 2 hours.

The pretreatment-activated cellulose thus obtained is then acetylated. This acetylation reaction employs, to 100 parts by weight of cellulose, 5 to 15 parts by weight (preferably 7 to 13 parts by weight, more preferably 8 to 11 parts by weight) of sulfuric acid, 200 to 400 parts by weight (preferably 240 to 280 parts by weight) of acetic anhydride and 300 to 600 parts by weight (preferably 350 to 500 parts by weight) of acetic acid.

An acetylation reaction is performed under a stirring condition over a period of 40 to 90 minutes with elevating the temperature almost at a constant rate up to 30 to 55° C. at which the temperature is kept for 15 to 60 minutes.

Since this acetylation reaction allows sulfuric acid to be bound to the cellulose in the form of a sulfate, this sulfate is removed by a saponification ripening process after completion of the reaction for the purpose of improving the heat stability.

For the saponification ripening, water or an aqueous solution of acetic acid is added to quench the acetylation reaction. The amount of water added is adjusted so that the water content in the reaction system becomes 2 to 10% by weight after the reaction with acetic anhydride present in the reaction system to form acetic acid followed by the saponification ripening treatment.

Also since a higher sulfate ion concentration leads to a difficulty in removing a sulfate efficiently, it is preferable to adjust the sulfate ion concentration in the reaction system at 0.2 to 1.0% by means of adding an aqueous solution of an alkaline earth metal acetate such as magnesium acetate or an acetic acid-water solution mixture, thereby forming an insoluble salt of sulfuric acid.

Also by adding, for example, a solution of magnesium acetate in an acetic acid-water solution mixture to a reaction system, the acetylation reaction can be quenched simultaneously with a reduction in the sulfate ion concentration.

A saponification ripening treatment is effected by keeping the temperature preferably at 40° C. to 60° C. or 40° C. or higher but below 60° C., more preferably 45° to 55° C. for a period of 20 to 120 minutes. The reaction temperature employed here is kept only by means of the reaction heat between the water added as described above and remaining unreacted acetic anhydride without any external heating of the inside or the outside of the reaction system.

In a saponification ripening process, utilization of the reaction heat between water and acetic anhydride leads to an ability of keeping the temperature of the entire reaction system uniform and appropriate, thereby avoiding a too high or too low deacetylation.

Subsequently, a known purification drying treatment is conducted to obtain an intended cellulose triacetate having a satisfactory filtration performance.

The cellulose triacetate of the present invention is dissolved in an organic solvent if necessary, and then can be molded into an article of various types.

An organic solvent employed upon molding may for example be a halogenated hydrocarbon, such as chloroform, dichloromethane and dichloroethane; an ether having 3 to 12 carbon atoms, for example, diisopropylether, dimethoxymethane, dimethoxyethane, 1,4-dioxane, 1,3-dioxorane, tetrahydrofuran, anisole and phenethol; a ketone having 3 to 12 carbon atoms, for example, acetone, methylethylketone, diethylketone, diisobutylketone, cyclohexanone and methylcyclohexanone; and an ester having 3 to 12 carbon atoms, for example, ethyl formate, propyl formate, pentyl formate, methyl acetate, ethyl acetate and pentyl acetate.

Each of the ether, ketone and ester may have a cyclic structure, and an organic solvent having two or more of the functional groups of ethers, ketones and esters (—O—, —CO— and —COO—) such as 2-ethoxyethyl acetate, 2-methoxyethanol and 2-butoxyethanol can be employed When the organic solvent has two or more different functional groups, the number of carbon atoms thereof may be any, so long as it is within the range prescribed for compounds having a functional group. Furthermore, an organic solvent may have other functional groups such as an alcoholic hydroxyl group.

Other organic solvents may also be employed in combination with ethers, ketones and esters. These organic solvents employed in combination may for example be nitromethane, alcohols each having 1 to 6 carbon atoms (such as methanol, ethanol, propanol, isopropanol, 1-butanol, t-butanol, 2-methyl-2-methylbutanol and cyclohexanol) and the like.

When other organic solvents are employed in combination with ethers, ketones and esters, each of the ethers, ketones and esters may be present in the solvent mixture preferably in an amount of 10 to 99.5% by weight, more preferably 20 to 99% by weight, most preferably 40 to 98.5% by weight, particularly preferably 60 to 98% by weight.

The amount of a solvent may vary depending on the final article to be molded in view of the moldability or other performances. For example, the amount of the solvent is adjusted so that the concentration of a cellulose triacetate becomes preferably 10 to 40% by weight, more preferably 10 to 30% by weight, most preferably 10 to 25% by weight, particularly 15 to 20% by weight.

Upon molding a cellulose triacetate, various additives such as a plasticizer, an anti-degradation agent, a UV protector and a colorant can be employed as desired for an intended use.

Among these additives, a plasticizer may for example be a phosphate such as triphenyl phosphate and tricresyl phosphate; a phthalate such as dimethyl phthalate, diethyl phthalate, dibutyl phthalate, dioctyl phthalate and diethylhexyl phthalate; a citrate such as acetyltriethyl citrate and acetyltributyl citrate; other carboxylates such as butyl oleate, methylacetyl ricinoleate, dibutyl sebacate, various trimellitates, which may be employed alone or in combination with each other. Among those listed above, a phthalate derivative plasticizer, especially, diethyl phthalate, is preferred for improving the resistance of a film against moisture and heat.

Examples of a method for producing a molded article such as a film or a fiber or the like employing a cellulose triacetate of the present invention are described below.

A cellulose triacetate film is produced by a solvent cast method using a cellulose triacetate solution In an ordinary solvent cast method, a prepared cellulose triacetate solution (dope) is cast over the surface of a support (for example, drum and band) which is mirror polished, dried into a film, and then peeled off. A drying is effected usually under atmospheric or reduced pressure at 20 to 250° C., preferably 30 to 200° C. The thickness of a film may vary depending on the intended purposes within the range of 0.1 to 250 $\mu$m. For example, an optical thin film employed for protecting an IC mask has a thickness of 0.1 to 3 $\mu$m, a packaging film has a thickness of 10 to 50 $\mu$m and a photograph or optical film has a thickness of 50 to 250 $\mu$m.

A cellulose triacetate fiber can be produced by spinning from a cellulose triacetate solution (dope) followed by the removal of a solvent, applicable in a dry- or wet-spinning. The solvent removal in dry spinning can be effected in drying conditions similar to the film production described above. The yarn level of a cellulose ester fiber is preferably 1 to 16 deniers, more preferably 1 to 10 deniers, most preferably 2 to 8 deniers. The cross-sectional configuration of a cellulose ester fiber may be round, oval, irregular shape (such as Y-shaped, X-shaped, I-shaped and R-shaped area), and the fiber may be a hollow fiber.

The cellulose triacetate of the present invention can be applied also to plastics, paint lacquers and electrical insulations and the like.

EXAMPLES

The present invention is further detailed in the following Examples which are not intended to restrict the present invention.

Example 1

100 Parts by weight of a cellulose pulp was sprayed with 50 parts by weight of glacial acetic acid to effect a pretreatment activation.

Subsequently, 470 parts by weight of glacial acetic acid, 260 parts by weight of acetic anhydride and 9 parts by weight of sulfuric acid were added to effect an acetylation treatment.

After completion of the acetylation, a 15% by weight solution of magnesium acetate in a solvent mixture of acetic acid and water was added until the concentrations of water and sulfate ion in the solvent became 3.0% by weight and 0.5% by weight, respectively, thereby decomposing acetic anhydride to quench the acetylation reaction. Upon this procedure, the reaction between water and acetic anhydride resulted in an elevation of the temperature in the reaction system to 50° C. The reaction system was allowed, as it was without any external heating, to be subjected to a saponification ripening treatment at the same temperature for 120 minutes, to obtain a cellulose triacetate having an acetylation degree of 61.3% and a viscosity average degree of polymerization of 298. The occlusion constant of the resulting cellulose triacetate was 57.

Example 2

100 parts by weight of a cellulose pulp was sprayed with 50 parts by weight of glacial acetic acid to effect a pretreatment activation.

Subsequently, 470 parts by weight of glacial acetic acid, 260 parts by weight of acetic anhydride and 10 parts by weight of sulfuric acid were added to effect an acetylation treatment.

After completion of the acetylation, a 15% by weight solution of magnesium acetate in a solvent mixture of acetic acid and water was added until the concentrations of water and sulfate ion in the solvent became 4.0% by weight and 0.4% by weight, respectively, thereby decomposing acetic anhydride to quench the acetylation reaction. Upon this procedure, the reaction between water and acetic anhydride resulted in an elevation of the temperature in the reaction system to 48° C. The reaction system was allowed, as it was without any external heating, to be subjected to a saponification ripening treatment at the same temperature for 60 minutes, to obtain a cellulose triacetate having an acetylation degree of 60.7% and a viscosity average degree of polymerization of 308. The occlusion constant of the resulting cellulose triacetate was 46.

Example 3

100 parts by weight of a cellulose pulp was sprayed with 50 parts by weight of glacial acetic acid to effect a pretreatment activation.

Subsequently, 470 parts by weight of glacial acetic acid, 260 parts by weight of acetic anhydride and 11 parts by weight of sulfuric acid were added to effect an acetylation treatment.

After completion of the acetylation, a 15% by weight solution of magnesium acetate in a solvent mixture of acetic acid and water was added until the concentrations of water and sulfate ion in the solvent became 4.5% by weight and 0.3% by weight, respectively, thereby decomposing acetic anhydride to quench the acetylation reaction. Upon this procedure, the reaction between water and acetic anhydride resulted in an elevation of the temperature in the reaction system to 52° C. The reaction system was allowed, as it was without any external heating, to be subjected to a saponification ripening treatment at the same temperature for 30 minutes, to obtain a cellulose triacetate having an acetylation degree of 60.8% and a viscosity average degree of polymerization of 302. The occlusion constant of the resulting cellulose triacetate was 53.

Comparative Example 1

100 parts by weight of a cellulose pulp was sprayed with 50 parts by weight of glacial acetic acid to effect a pretreatment activation.

Subsequently, 470 parts by weight of glacial acetic acid, 260 parts by weight of acetic anhydride and 8 parts by weight of sulfuric acid were added to effect an acetylation treatment.

After completion of the acetylation, a 15% by weight solution of magnesium acetate in a solvent mixture of acetic acid and water was added until the concentrations of water and sulfate ion in the solvent became 3.0% by weight and 0.5% by weight, respectively, thereby decomposing acetic anhydride to quench the acetylation reaction. Upon this procedure, the reaction between water and acetic anhydride resulted in an elevation of the temperature in the reaction system to 50° C., which was raised further to 65° C. by introducing steam, and then a saponification ripening treatment was conducted for 40 minutes, to obtain a cellulose triacetate having an acetylation degree of 609% and a viscosity average degree of polymerization of 299. The occlusion constant of the resulting cellulose triacetate was 94.

Experiment 1

Each of the cellulose triacetates obtained in Examples 1 to 3 was dissolved in a solvent mixture of methylene chloride/methanol (9/1, w/w) at the solid concentration of 20% by weight to obtain a dope. This dope was subjected to a continuous spinning for 24 hours at the outlet line speed of 500 m/min from a spinning nozzle having 200 micropores in total, each having a pore size of 30 $\mu$m in diameter. As a result, the spinning condition after 24 hours was similar to the initial condition, and the optical microscope examination of a micropore after 24 hours revealed a deposited matter only in 25% or less of all the micropores.

On the other hand, the cellulose triacetate obtained in Comparative Example 1 was subjected to the same spinning test, and spinning became impossible after 8 hours. Upon this, a micropore was observed similarly and was revealed to be occluded mostly with a deposited matter.

What is claimed is:

1. A cellulose triacetate having an occlusion constant K no greater than 70, said occlusion constant K being determined by dissolving the cellulose triacetate in a solvent mixture of methylene chloride/methanol at 9/1 w/w to form a 16% by weight solution as a solids concentration, filtering the solution under a constant filtration pressure of 3 kg/cm$^2$ and temperature of 25° C. using a muslin filter to determine a filtered volume with the lapse of time, and calculating the slope of a linear curve represented by t/V–t to obtain the occlusion constant K, wherein the occlusion constant K is the slope$\times 2 \times 10^4$, t is a filtration time in seconds and V is a filtered volume in millimeters.

2. The cellulose triacetate of claim 1, which has an average acetylation degree of 59 to 62.5%.

3. The cellulose triacetate according to claim 1, which has a viscosity average degree of polymerization of 200–400.

4. A method for producing cellulose triacetate comprising the steps of acetylating cellulose and conducting a saponification ripening treatment of the acetylated cellulose, wherein the only heat supplied during the saponification ripening treatment results from the temperature elevation due to the reaction heat from water added for quenching the acetylation reaction and remaining unreacted acetic anhydride.

5. The method of claim 4, additionally comprising a pretreatment activation and acetylation of the cellulose and conducting the saponification ripening treatment at a temperature of 40° C. or higher but under 60° C.

6. The cellulose triacetate of claim 1, prepared by a process comprising the steps of acetylating cellulose and conducting a saponification ripening treatment of the acetylated cellulose, wherein the only heat supplied during the saponification ripening treatment results from the temperature elevation due to the reaction heat from water added for quenching the acetylation reaction and remaining unreacted acetic anhydride.

7. The cellulose triacetate of claim 6, wherein the cellulose is subjected to a pretreatment activation and acetylation and the saponification ripening treatment is conducted at a temperature of 40° C. or higher but under 60° C.

8. The cellulose triacetate of claim 1, wherein the occlusion constant K is no greater than 60.

* * * * *